UNITED STATES PATENT OFFICE.

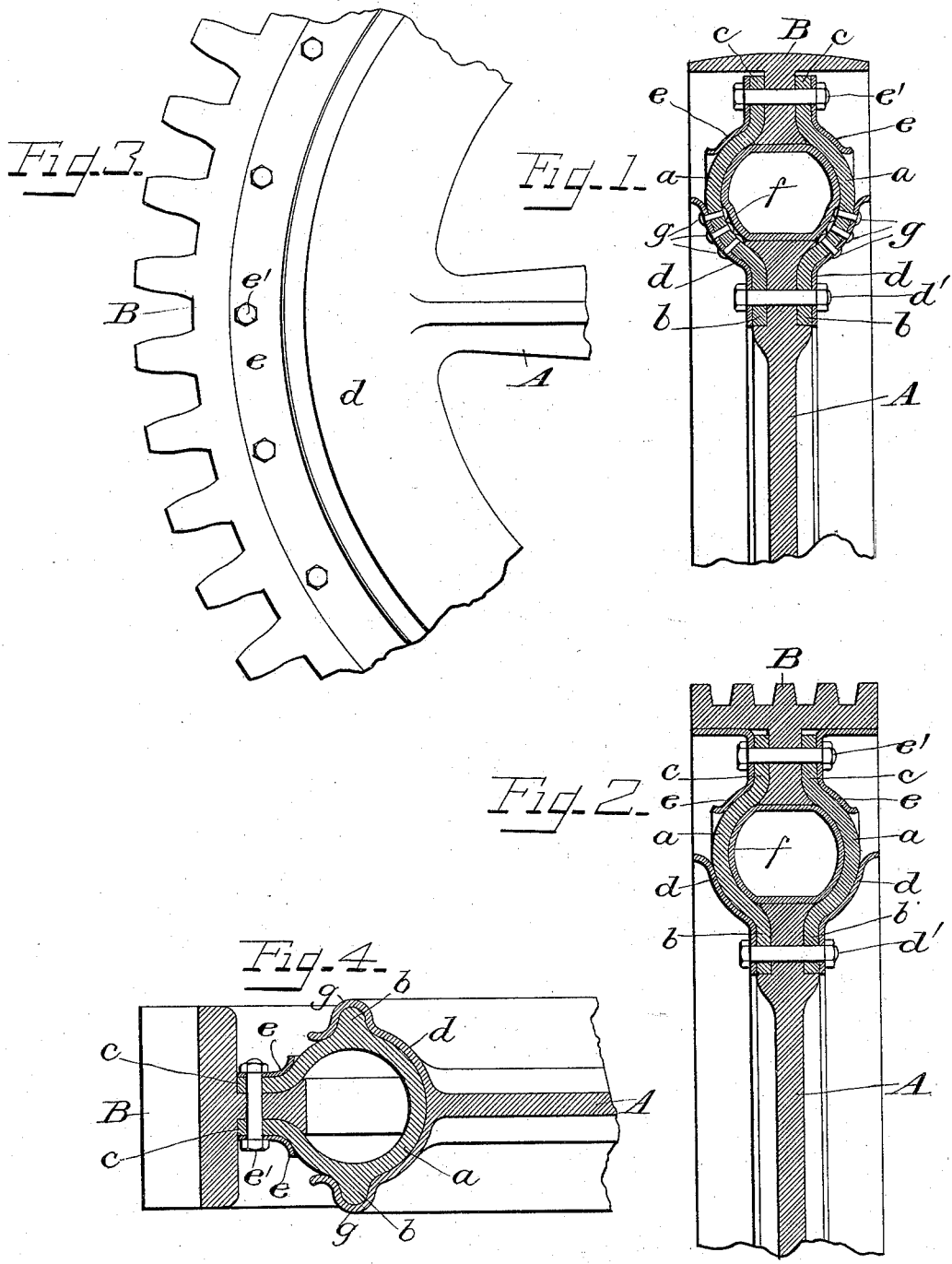

FREDERICK RICHARD SIMMS, OF LONDON, ENGLAND.

PULLEY, TOOTHED WHEEL, &c.

SPECIFICATION forming part of Letters Patent No. 610,002, dated August 30, 1898.

Application filed December 28, 1897. Serial No. 664,066. (No model.)

*To all whom it may concern:*

Be it known that I, FREDERICK RICHARD SIMMS, a subject of the Queen of Great Britain, residing at London, England, have invented new and useful Improvements in Pulleys, Toothed Wheels, and the Like, of which the following is a specification.

This invention relates to improvements in the construction of pulleys, toothed wheels, friction-wheels, and the like used for transmitting power and for other purposes, and has for its object to so construct such wheels and pulleys that they shall yield to shocks, thereby avoiding the danger of fracture, which frequently occurs in wheels and pulleys as now generally constructed. To this end I arrange one or more elastic or air cushions between the peripheral portion of the said wheels or pulleys and the main portion of the same.

In carrying out my invention I advantageously form the air-cushion of two rings of suitable elastic material, such as india-rubber or leather, molded to a semicircular shape in cross-section and having flanges. The two inner flanges are secured to an inner casing or to inner casings rigidly fixed to the body of the wheel or pulley, while the two outer flanges are secured to an outer casing or to outer casings rigidly fixed to the peripheral portion of the wheel or pulley. The space so formed between the two rings may be provided with an inner or air tube, if desired.

In the accompanying drawings, Figure 1 is a section through a portion of a friction-wheel having my improvements applied thereto. Fig. 2 is a similar view of a belt-pulley. Fig. 3 is a side elevation of a portion of a spur-wheel made according to my invention, and Fig. 4 is a section through the same.

$a\ a$ are the two rings of india-rubber, leather, or the like which form the air-cushion and are molded to a semicircular shape in cross-section, and $b\ b$ are the inner flanges upon the inner periphery of the rings $a\ a$, $c\ c$ being the flanges upon the outer periphery thereof. $d\ d$ are inner casings, preferably made of sheet metal, by means of which the said inner flanges $b\ b$ are fixed to the body A of the wheel or pulley through the medium of bolts $d'\ d'$, and $e\ e$ are outer casings, also preferably made of sheet metal, and by means of which the outer flanges $c\ c$ of the rings $a\ a$ are rigidly fixed to the peripheral portion B of the wheel or pulley through the medium of bolts $e'\ e'$.

$f$, Figs. 1 and 2, is an air-tube provided in the space formed between the two rings $a\ a$, and $d\ d$, Fig. 2, are rivets $g\ g$ for securing the inner casings $d\ d$ to the rings $a\ a$.

In Figs. 3 and 4 the inner casing is shown formed in one piece continuous with the body of the wheel instead of by two sheet-metal rings $d\ d$, as above mentioned. In this case also the inner ends of the two molded rings $a\ a$ are joined together and the flanges $b\ b$ are placed laterally and arranged to enter recesses $g'\ g'$ formed in the inner casing $d$.

It will be obvious that any of the above-described constructions can be applied to any form of pulley or wheel.

Having now particularly described and ascertained the nature of my said invention and in what manner the same is to be performed, I declare that what I claim is—

1. In a driving-wheel, the combination with the main body of the wheel, of a pneumatic cushion surrounding the same, having separated edges along its periphery, an outer rim surrounding said cushion and provided with an inwardly-extending web, fastening devices passing laterally through said separated edges and said web and driving projecting portions on the outer surface of said rim, substantially as described.

2. In a driving-wheel, the combination with the main body, of a pneumatic cushion surrounding the same, said cushion comprising two rings semicircular in cross-section, means for attaching the inner edges to the main body of the pulley, an outer rim surrounding said cushion and provided with an inwardly-extending web, adapted to enter between the outer edges of said rings, clamping annular casings engaging the outer faces of said outer edges, and fastening devices extending transversely through said casings, outer edges and web, substantially as described.

3. In a driving-wheel, the combination with the main body, of a pneumatic cushion surrounding the same, said cushion comprising two rings semicircular in cross-section, means for attaching the inner edges to the main body of the pulley, an outer rim surrounding said cushion and provided with an inwardly-extending web, adapted to enter between the outer edges of said rings, annular casings engaging the outer surfaces of said outer ring edges for clamping them upon said web and fastening devices extending transversely through the said casings, outer ring edges and said web, substantially as described.

4. In a wheel, the combination with the main body, of a pneumatic cushion surrounding the same comprising two rings semicircular in cross-section, having their inner edges lying on each side of a portion of the said main body, inner clamping-casings on each side of said inner edges, clamping devices passing transversely through said inner edges, inner casings and the adjacent portion of said main body, an outer rim surrounding said cushion and provided with an inwardly-extending web, adapted to enter between the outer edges of said rings, outer clamping-casings on each side of said outer edges, and clamping devices passing transversely through said outer casings, outer ring edges and said web, substantially as described.

FREDERICK RICHARD SIMMS.

Witnesses:
H. M. SCOTT,
ARTHUR L. HEMING.